April 8, 1969
F. L. LAWRENCE
3,436,986
CLUTCH-CONTROLLED, TWO-SPEED, POWER-TRANSMITTING MECHANISM
Filed July 19, 1966
Sheet _1_ of 4
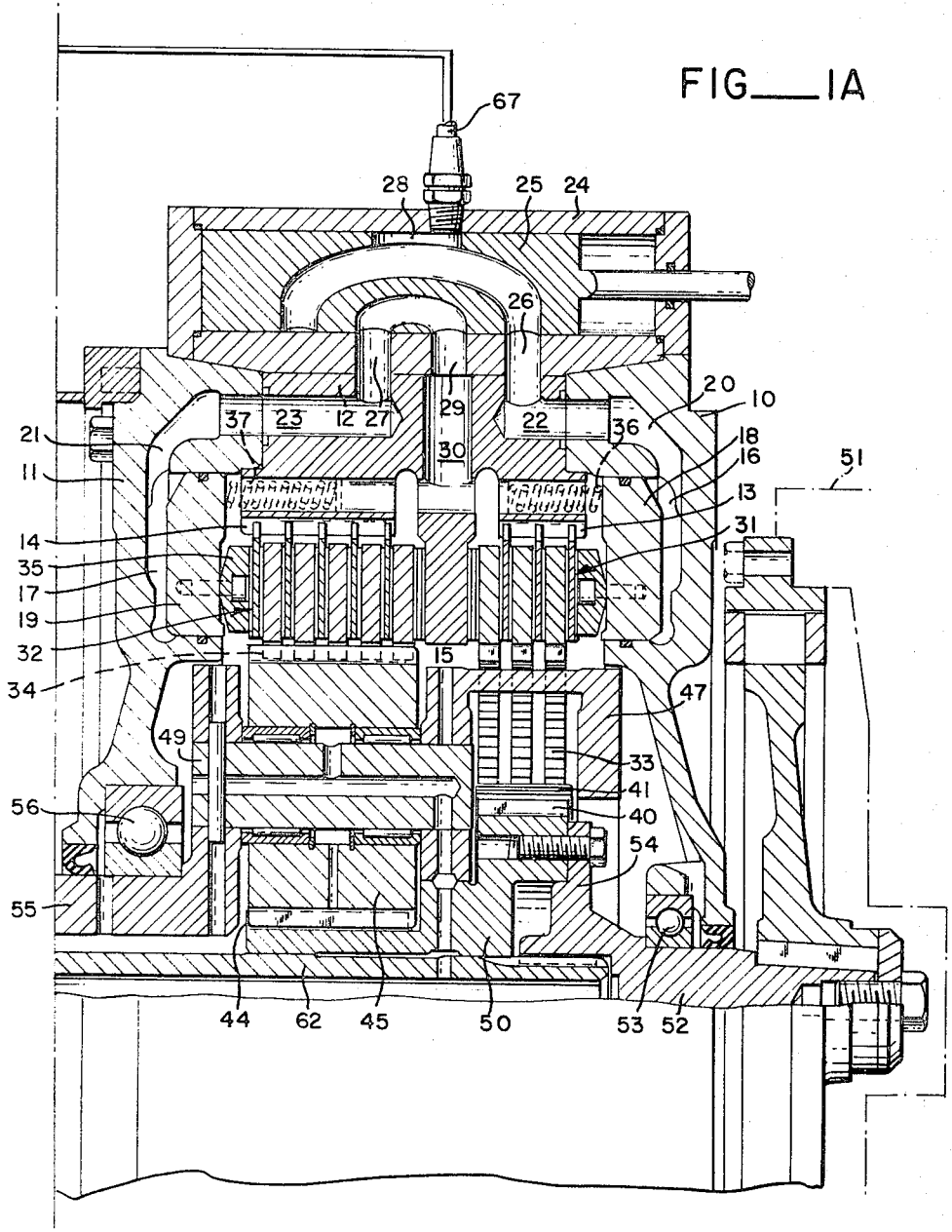
FIG__1A
FRANK L. LAWRENCE
INVENTOR.
BY 
ATTORNEYS

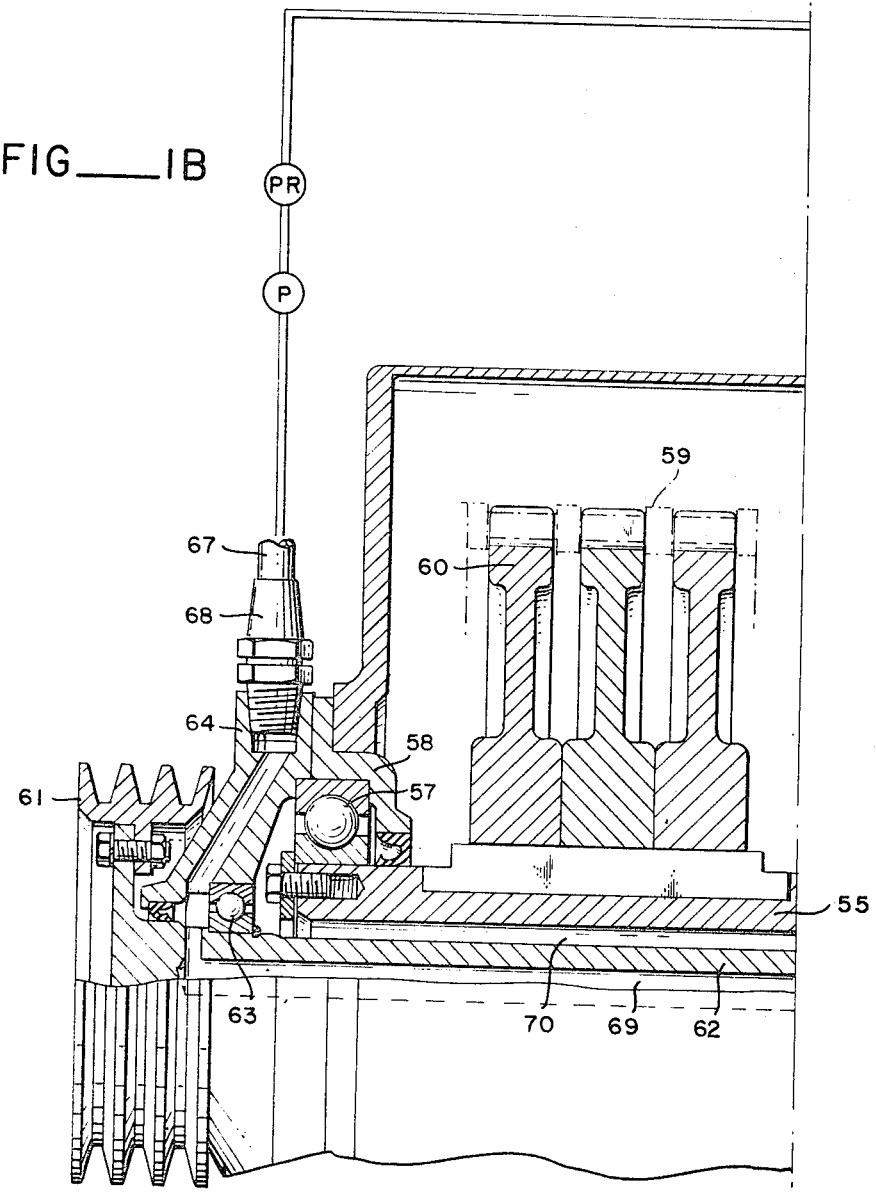

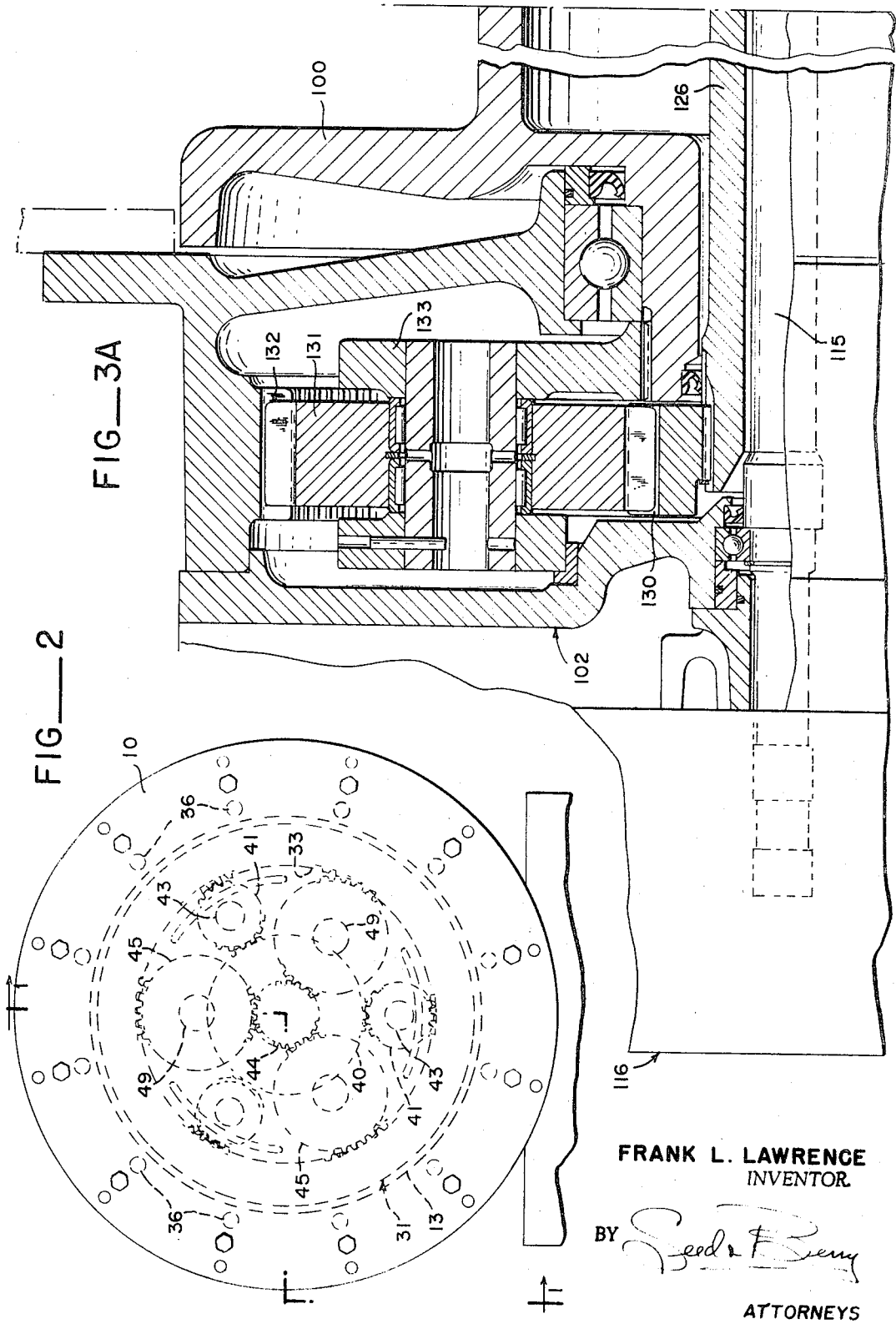

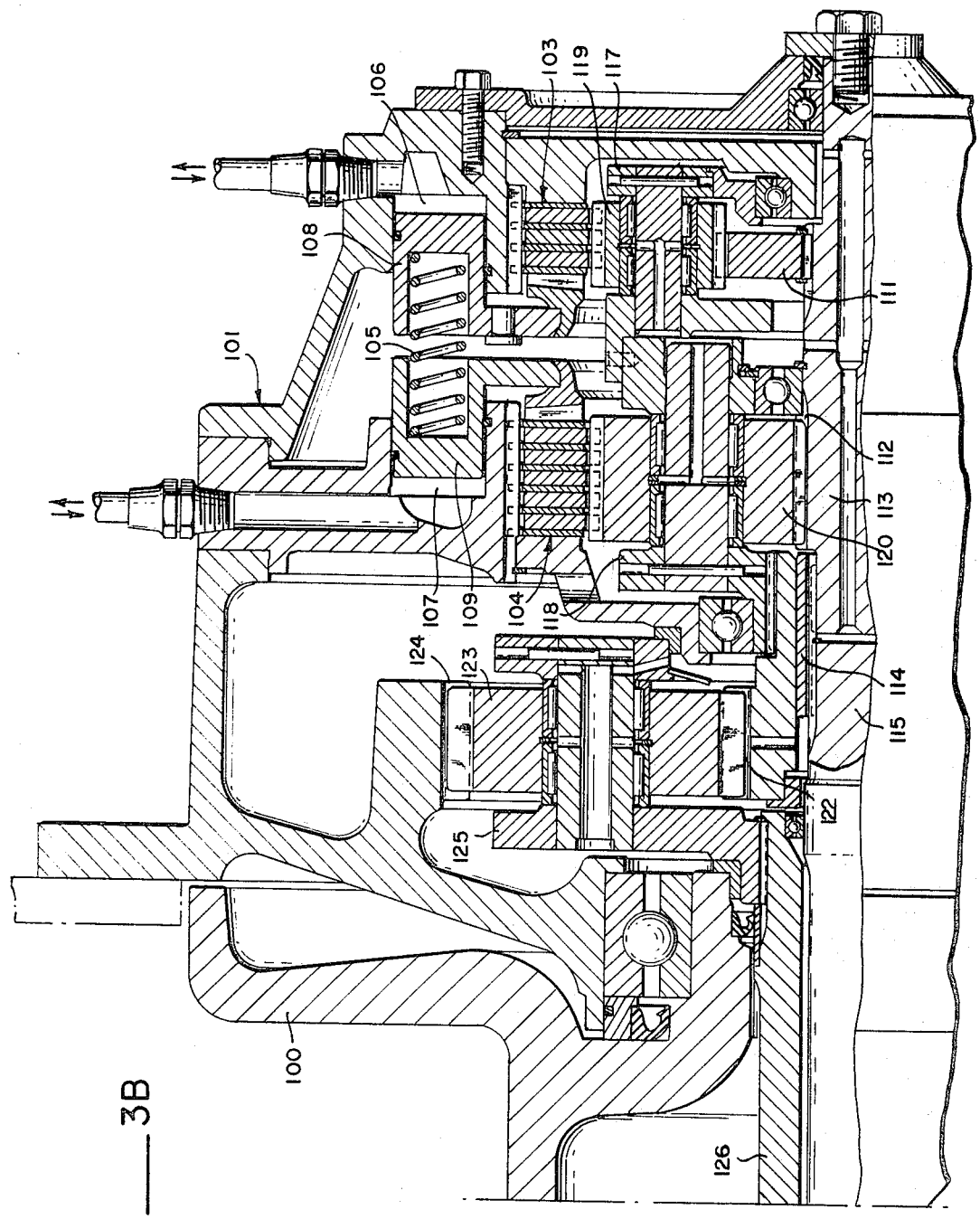

United States Patent Office 3,436,986
Patented Apr. 8, 1969

3,436,986
CLUTCH-CONTROLLED, TWO-SPEED, POWER-TRANSMITTING MECHANISM
Frank L. Lawrence, Vancouver, British Columbia, Canada, assignor to Lawrence & Schild Ltd., a corporation of Canada
Filed July 19, 1966, Ser. No. 566,421
Int. Cl. F16h 57/10
U.S. Cl. 74—768                                           6 Claims

ABSTRACT OF THE DISCLOSURE

This invention relates to a two-speed power-transmitting mechanism having a reversible motor, preferably hydraulic, as its power source and for each of its two ratios of transmitted power employing a respective planetary gear system. Including, in the instance of each such planetary gear system, the usual sun gear, ring gear, and spider-carried planet pinions, the invention is one in which the ring gears admit to free rotation and wherein the planetary systems are brought into play, selectively, by the use of brakes to arrest the rotation of the related ring gear.

---

For its general object the invention aims to provide a perfected transmission mechanism of the described character having friction brakes for accomplishing the arrestation of the ring gears.

As a further important object the invention aims to provide a transmission mechanism having its parts so designed and arranged that the mechanism can be compacted into an unusually small compass.

A still further object is to provide a transmission mechanism of the described character in which the operation of the brakes is performed by hydraulic pressure acting counter to the force of coil springs.

With the foregoing and yet additional objects and advantages in view, the invention consists in the novel construction and in the adaptation and combination of parts hereinafter described and claimed.

*Description of drawings*

In the accompanying drawings:
FIGURES 1A and 1B are views partly in elevation and partly in longitudinal vertical section and which, taken together, show one embodiment of the present invention, with the section line indicated by 1—1 of FIG. 2.
FIG. 2 is an end elevation thereof; and
FIGS. 3A and 3B are fragmentary views partly in elevation and partly in longitudinal vertical section and which, when similarly taken together, illustrate another embodiment of the invention here shown applied to drive a winch with the drive passing from the two-speed transmission through two successively acting constant-ratio planetary gear systems.

*Description of invention*

Referring first to the embodiment of the invention shown in FIGS. 1A, 1B and 2, there is provided a hollow casing comprised of front and rear centrally apertured headers 10 and 11 having a piloted fit with and bolted to an intervening shell section 12. The shell section is formed to present two axially spaced rings of internal splines 13 and 14, and has an internal web 15 occupying an intervening position between such gear teeth. Annular cylinders, as 16 and 17, are formed in the headers, each facing inwardly toward the web, and a respective one of two ring-shaped pistons 18 and 19, each fitted with a pressure-sealing O-ring, is received in each cylinder.

Two-way flow passages 20 and 21 connect the cylinders with separated openings 22 and 23 formed in the top wall of the shell section. A valve body 24 which serves as a chest for the shuttle movement of a shift-governing 2-position valve 25 seats upon said top wall. This valve body presents four ports 26, 27, 28 and 29. Ports 26 and 27 communicate with the openings 22 and 23, respectively. Port 28 is a supply port connecting with a pressure source of hydraulic fluid. Port 29 is a dump port and communicates with a passage 30 leading to the interior of the casing. The interior of the casing serves as a reservoir from which the pressure source draws its hydraulic fluid.

Within the hollow interior of the casing a respective multiple-disc brake, as 31 and 32, is received at each of the opposite sides of the web 15. Comprised of alternating nonrotary and rotary annular discs, with the nonrotary discs each having a friction facing front and rear, one such nonrotary disc is riveted to the web while the remaining nonrotary discs present external teeth spline-connected to the shell section. The rotary discs, which intervene, are formed with internal gear teeth, as 33 and 34. Pressure fluid supplied to the cylinders 16 and 17, upon a shuttle movement of the control valve 25 into either of its two positions, acts through piston-carried thrust shoes 35 to engage the related brake. Counteracting springs 36 and 37 disengage the brakes upon bringing the concerned passages 20–22 or 21–23 into communication with the dump passage 30.

Said gear teeth 33 and 34 serve as ring gears for planetary gear systems, those of the brake 31 for a planetary system which provides one gear ratio and those of the brake 32 for a planetary system providing a different gear ratio.

There is included with the ring gear 33 in one such planetary system a sun gear 40, a set of planet pinions 41 lying between and in mesh with the sun gear and the ring gear, and a carrier giving support to spindles 43 on which the planet pinions are journaled. The other planetary system has a sun gear 44, a set of planet pinions 45 in mesh with the sun gear and the ring gear 34, and a carrier giving support to spindles 49 on which the planet pinions are journaled. A single carrier, denoted by 47, serves both systems, and the two sun gears, while having different diameters, are formed upon a common center-bored muff 50.

The drive to the transmission is here shown as coming off a torque converter 51 to the exposed front end of a stub input shaft 52 journaled by a bearing 53 in the center aperture of the casing's front header 10. The rear end of the stub shaft is flanged, and this flange 54 is bolted to the muff.

The carrier is prolonged rearwardly by a hollow output shaft section 55, and the two ends of the shaft section receive a journal mounting from rather widely spaced bearings 56 and 57. A rear extension 58 of the header 11 carries the bearing 57. An output chain 59 works in the space between the bearings, engaging the teeth of a sprocket wheel 60 keyed to the output shaft section 55.

The transmission is shown as having a power take-off pulley 61 direct-driven by a mandrel 62 from the input shaft 52. Such mandrel is received through the hollow center of the output shaft section with its inner end fitting within the muff and being splined to the input shaft. The outer end is journaled in a bearing 63 carried by a nose section 64 which is bolted to the extension 58 to occupy a position to the rear of the bearing 57. A pipe 67 through which the pressure source draws its supply of fluid connects with the nose cone by a fitting 68, the fluid feeding thereto through a center-bore 69 of the mandrel and a passage 70 which surrounds the mandrel. Suitable seals are provided to insure an oil-tight casing.

Referring now to the embodiment of FIG. 3, wherein I have shown a modified arrangement of my transmission structure applied as a part of a reduction hook-up between a power plant and a winch, such transmssion is housed in one of two hollow casings 101 and 102 serving as cheek bitts for the spooling drum 100 of the winch. The modified arrangement, like that of the first-described embodiment, provides two planetary gear systems which are made operative, selectively, by the instrumentality of engaging one or the other of two multiple-disc brakes 103 and 104, but such brakes are here shown as employing the force of a spring 105 for their engagement and the pressure of hydraulic fluid for their disengagement, such fluid being supplied from a pressure source through either of two flow lines, selectively, to cylinders 106 and 107. Pistons 108 and 109 which are functional to the brakes work in the cylinders, and it will be understood that a control valve, located by preference remote to the winch, causes fluid to be dumped from one cylinder—thus to engage the related brake—when brake-disengaging pressure fluid is supplied to the other cylinder.

The sun gears 111 and 112 for the two planetary systems are made to turn in unison, with one being splined to and the other made a part of a spindle 113 spline-coupled by a quill 114 to a shaft 115 which is driven from a reversible hydraulic motor 116. The two carriers 117–118 for the planet pinions 119–120 of said planetary systems are pinned or otherwise connected so as to turn as one, and carry their drive to the spooling drum 100, with consequent further speed reductions, by passing successively through two constant-acting planetary systems housed one in the cheek bitt 101 alongside the two brake-selected planetaries and the other in the cheek bitt 102. The first of these constant-acting planetary systems has its sun gear 122 splined to the carrier 118. Its planet pinions 123 walk about a stationary internal gear 124, and the related carrier 125 is splined to the head end of a drive sleeve 126. The sleeve surrounds the drive shaft 115 and extends by its tail end into the interior of the cheek bitt 102. Splined to such tail end is the sun gear 130 for the planet gears 131 of the final-drive planetary, which has a stationary internal gear 132. The carrier, or spider, 133 is splined to the spooling drum.

It is believed to be unnecessary to trace the operations in that the manner in which planetary systems function is well understood. It is my intention that no limitations be implied and that the hereto annexed claims be given the broadest interpretation to which the employed language fairly admits.

What is claimed is:

1. In a transmission, the combination of a spooling drum of a winch having at least two coaxial planetary gear systems distinguished one from the other in point of their gear ratios and including in each instance a respective sun gear together with a respective ring gear and a respective carrier supporting a respective set of planetary pinions in mesh with the related sun gear and the related ring gear, the two ring gears being each journaled for rotation, a power plant drivingly connected with the two sun gears, a respective brake for each ring gear operative when engaged to arrest the rotation of the related ring gear, and a fluid-power-operated means common to both brakes and subject to manual control for engaging a selected one of the brakes while simultaneously disengaging the other brake so that the planet gears related to the arrested ring gear partake of orbital travel causing the related carrier to responsively rotate at a speed reflecting the gear ratio of the selected planetary gear system, the two carriers being interconnected so that the same turn as one, and having associated with said brake-activated systems two constant-acting planetary reduction gear systems which lie co-axial one to the other and to the brake-activated systems, the selected one of said brake-activated systems serving as the first stage of a three-stage system having the two constant-acting systems as its second and third stages, with the two connected carriers of such brake-activated systems being connected to the input component of the second-stage system and the output component of such second-stage system being connected to the input component of the third-stage system, the two selectively employed first-stage systems and the second-stage system being housed in one of two hollow casings serving as the mounting cheek bitts for the spooling drum of the winch, the third stage system being housed in the other hollow casing, the output component of said third-stage system being drivingly connected with the spooling drum.

2. A transmission as claimed in claim 1 in which said means subject to manual control comprises, for each brake, a respective single-acting pressure-fluid operated piston-and-cylinder assembly working counter to the force of a spring and characterized in that the two said assemblies are operatively interconnected in a manner such that as pressure fluid is delivered to one it is dumped from the other.

3. A transmission as claimed in claim 1 in which the planetary gear systems and the brakes are housed in an oil-tight casing, the means subject to manual control comprising hydraulically operated piston-and-cylinder assemblies included in a fluid-flow system which dumps the fluid from the cylinders into the casing and employs said casing as a reservoir from which the fluid-flow system draws its fluid.

4. A transmission as claimed in claim 1, the brakes being disc brakes mounted in surrounding relation to the related planetary system with each brake characterized in that at least one of its discs is anchored against rotation and at least one other of its discs has internal teeth which form the ring gear for the related planetary system.

5. A transmission as claimed in claim 4 in which said means subject to manual control comprises, for each brake, a respective pressure-operated piston-and-cylinder assembly, the planetary gear systems and the brakes being housed in a multisection casing one section of which presents an annular web occupying an intervening position between the brakes and against which the brakes bear by force exerted from said piston-and-cylinder assemblies.

6. A transmission as claimed in claim 1 in which the spooling drum has a through-opening in its center and wherein the driving connection from the second-stage constant-acting system to the third-stage constant-acting system comprises a hollow spindle received through said open center of the drum, and a power plant for the drum mounted from the bitt in which the third-stage system is housed and connected with the sun gears of the two first-stage systems by a drive shaft received through the hollow center of said driving spindle.

References Cited

UNITED STATES PATENTS

| | | | |
|---|---|---|---|
| 3,255,643 | 6/1966 | Hause | 74—695 |
| 2,624,215 | 1/1953 | McRae | 74—768 X |
| 2,932,216 | 4/1960 | Schou | 74—768 X |
| 3,021,729 | 2/1962 | Chambers et al. | 74—768 |
| 3,137,182 | 6/1964 | Berchtold et al. | 74—769 X |
| 3,228,501 | 1/1966 | Eason et al. | 192—69 |
| 3,234,821 | 2/1966 | Himmel et al. | 74—768 X |
| 3,236,347 | 2/1966 | Puls et al. | 192—69 |
| 3,290,962 | 12/1966 | McCann et al. | 74—768 X |
| 3,347,113 | 10/1967 | Ramsel | 74—769 X |

ARTHUR T. McKEON, *Primary Examiner.*